United States Patent

Dounoucos et al.

[15] 3,664,359
[45] May 23, 1972

[54] AIRCRAFT CLOSED CIRCUIT BREATHING SYSTEM

[72] Inventors: Angelo Dounoucos, Schenectady, N.Y.; John W. Harrison, Manchester, Mass.

[73] Assignee: General Electric Company

[22] Filed: Feb. 27, 1970

[21] Appl. No.: 18,398

Related U.S. Application Data

[62] Division of Ser. No. 741,527, July 1, 1968, Pat. No. 3,552,392.

[52] U.S. Cl. ........................................... 137/81, 137/505.47
[51] Int. Cl. ................................................ A62b 9/02
[58] Field of Search ................. 137/81, 85, 63 R; 128/142

[56] References Cited

UNITED STATES PATENTS 2,220,905  11/1940  Johnson ................................. 137/81
3,547,118  12/1970  Kolman et al ......................... 128/204

FOREIGN PATENTS OR APPLICATIONS 589,201  6/1947  Great Britain ............................. 137/81

Primary Examiner—Alan Cohan
Assistant Examiner—Richard Gerard
Attorney—Richard R. Brainard, Paul A. Frank, Charles T. Watts, Leo I. Ma Lossi, Frank L. Neuhauser, Oscar B. Waddell and Melvin M. Goldenberg

[57] ABSTRACT

An improvement is presented in an aircraft oxygen closed circuit breathing system wherein in place of the previously proposed flexible breathing bag rendering the system volume a variable, a compressor is employed converting the system to one having a variable pressure and a constant volume.

1 Claim, 3 Drawing Figures

INVENTORS:
ANGELO DOUNOUCOS;
JOHN HARRISON,
by [signature]
THEIR ATTORNEY

INVENTORS:
ANGELO DOUNOUCOS;
JOHN HARRISON,
by [signature]
THEIR ATTORNEY

AIRCRAFT CLOSED CIRCUIT BREATHING SYSTEM

This application is a division of application Ser. No. 741,527 Dounoucos et al. filed July 1, 1968 (now U.S. Pat. No. 3,552,392) and assigned to the assignee of the instant application.

BACKGROUND OF THE INVENTION

Existing breathing systems in aircraft are waste systems in which liquid oxygen is conducted to a heat exchanger and converted to gaseous oxygen. Exhaled gases, though still rich in oxygen, are not refurbished or recycled.

Such refurbishing and recycling of exhaled gases has been proposed, it having been recognized in such proposals that in a closed circuit breathing system means have to be provided to compensate for system volume changes for the safety of the user e.g. the pilot, and to prevent needless expulsion of oxygen from the system during violent aircraft maneuvers. The most significant system volume change requiring compensation is the expansion and contraction of the lungs of the user. Heretofore, it has been contemplated that compensation of system volume changes would be accomplished by a flexible breathing bag incorporated in the system as, for example, is shown in U.S. application Ser. No. 615,582 —Dibelius et al. (now U.S. Pat. No. 3,489,144) filed Feb. 13, 1967 and U.S. application Ser. No. 664,875 —Dounoucos, filed Aug. 31, 1967. The aforementioned applications have been assigned to the assignee of the instant invention.

In essence, the closed circuit breathing systems described in the above-mentioned patent applications consist of a fixed volume (conduits, carbon dioxide removal apparatus, sterilizer, etc.) and two flexible volumes (the lungs and the breathing bag). In an aircraft under steady-state conditions, the breathing bag must have sufficient capacity to absorb the tidal volume in the breathing cycle of each user, e.g. the pilots. If the aircraft either climbs or dives, there will be further expansion or contraction required in the volume of the system in order to conserve the oxygen supply. The alternative would be to allow oxygen to bleed off during any climb of the aircraft or to have additional oxygen be drawn from the storage supply during any dive of the aircraft. Repeated climbs and dives would then precipitate a serious loss and an unnecessarily high usage rate of oxygen. This, in turn, would require a greater than practical capacity for storage and concentration. Analysis of the problem indicates that in order to satisfy these conditions the minimum volume of the breathing bag (for two users) would have to be greater than 20 liters, a requirement which (due to space limitations) would considerably limit the number of aircraft to which such systems would be applied.

The art is, therefore, in need of an improved system component in place of the flexible breathing bag, which occupies a much smaller space.

SUMMARY OF THE INVENTION

The aforementioned need in the art is satisfied by the instant invention in which a previously proposed variable volume system is supplanted by a variable pressure, constant volume system utilizing a compressor. The result is a pressurized system of marked superiority, which provides the additional benefit of automatic pressure breathing capability wherein the pressure of the oxygen supplied to the user is slightly higher than the pressure outside the body in order to induce breathing. The space occupied by the compressor is less than 15 percent of the space required by the flexible breathing bag. Provision is made for continued short term closed-loop breathing in the event of failure of the alternating current power required for operation of the compressor.

BRIEF DESCRIPTION OF THE DRAWING

The exact nature of this invention as well as other objects and advantages thereof will be readily apparent from consideration of the following specification relating to the annexed drawing in which.

DESCRIPTION OF THE PREFERRED EMBODIMENT

Figure 1:
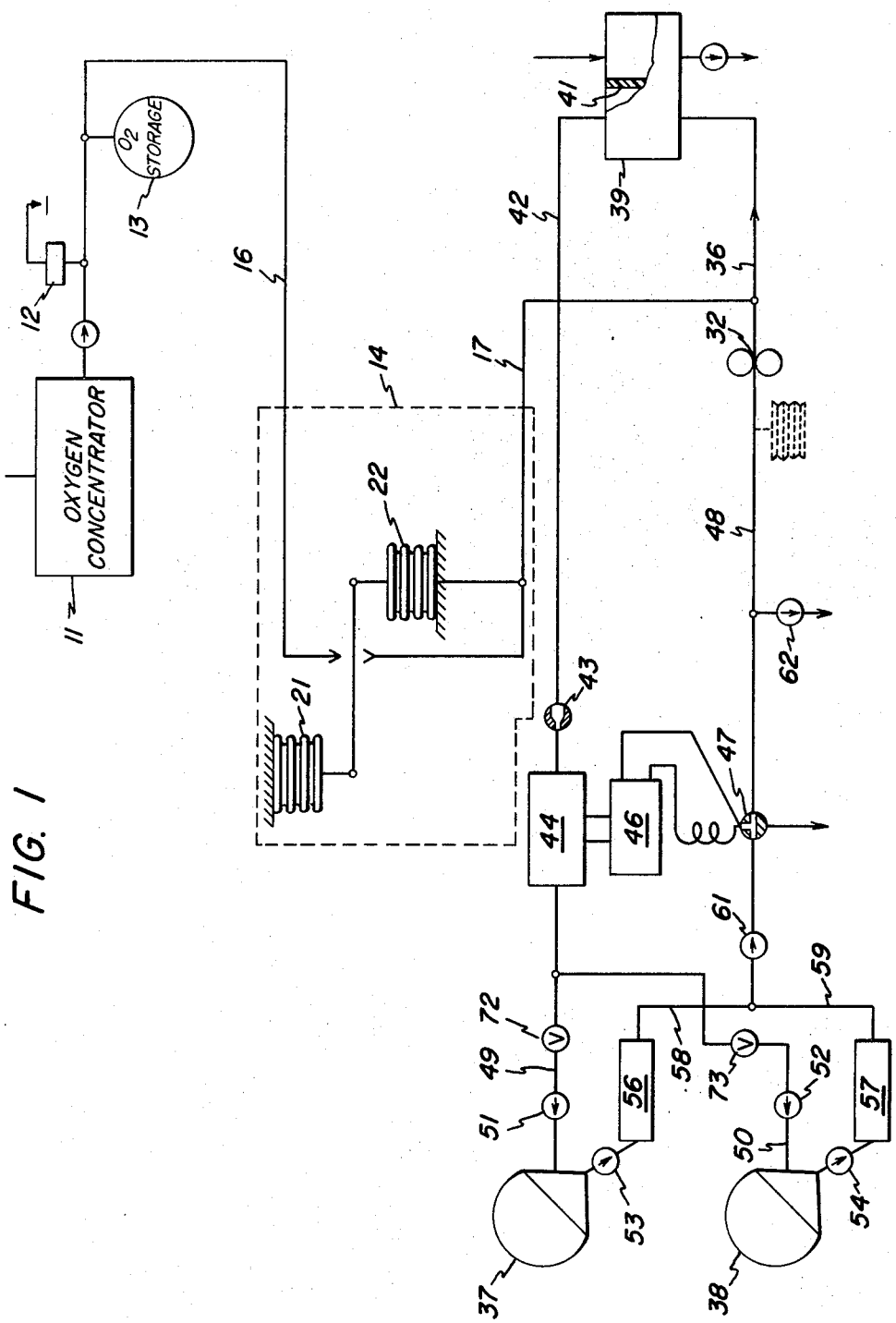
FIG. 1 is a schematic diagram of a self-contained aircraft oxygen system incorporating a compressor rendering this a variable pressure, constant volume system.
Figure 2:
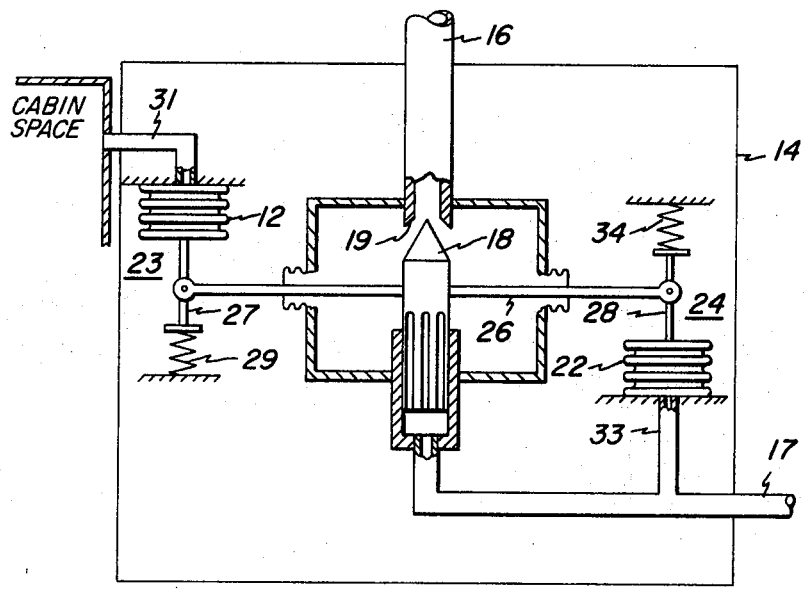
FIG. 2 is a detailed presentation of a device for maintaining a given relationship between oxygen admission to a conduit and a minimum pressure difference and FIG. 3 is a schematic representation of a typical compressor construction utilizable in this improved system.

In the aircraft oxygen system shown in FIG. 1, either air of considerably increased oxygen concentration or substantially pure oxygen is discharged from oxygen concentrator 11 under the control of concentration on-off pressure switch 12 either for storage under pressure in oxygen container 13 for later use or for direct controlled admission to the cabin breathing system via oxygen admission control device (loop pressure regulator) 14. This oxygen admission control device 14 is shown in greater detail in FIG. 2. The transmission of oxygen gas from conduit 16 to conduit 17 is controlled by valve element 18. The positioning of valve element 18 relative to valve seat 19 is dependent upon the pressures in bellows 21 and bellows 22, representing cabin altitude reference unit 23 and loop pressure reference unit 24, respectively. Lever 26, pivotally connected to valve element 18 is pivotally connected at one end to rod 27 in cabin altitude reference unit 23 and at the other end of rod 28 in loop pressure reference unit 24. The relative upward-downward movements of rods 27, 28, therefore, serve to determine the vertical positioning of valve element 18. At the upper end thereof rod 27 is connected to bellows 21 and is positioned thereby while the lower end thereof is connected to calibrated spring 29. The extension or contraction of bellows 21 is dependent upon cabin pressure, bellows 21 being in flow communication with the cabin space via conduit 31. Rod 28, on the other hand, is connected at its lower end to bellows 22. The movement of bellows 22 is determined by the gas pressure in the closed breathing loop downstream of compressor 32, which is communicated to bellows 22 via conduit 17 and tube 33. The upward extension of bellows 22 is resisted by calibrated spring 34. The calibration of springs 29, 34 serves to provide for a minimum pressure differential, e.g. 5 psi between cabin and loop.

The oxygen concentrator 11 may be a permselective membrane oxygen enrichment unit as is disclosed in aforementioned application Ser. No. 615,582 or a solid electrolyte fuel cell operated in reverse as described in the aforementioned application Ser. No. 664,875. Both of the aforementioned patent applications are incorporated by reference herein.

Make-up oxygen enters the breathing system via conduit 17 into exhaust line 36 carrying exhaled air from breathing masks 37, 38 worn by pilots, for example, this air having been compressed by compressor 32. This pressurized exhaled air plus make-up oxygen passes to carbon dioxide scrubber 39, wherein the carbon dioxide content of the exhaled air is depleted by passage of carbon dioxide gas at a high rate through permselective membrane 41. Some oxygen is lost from the system at the same time, but the permselective membrane is properly selected such that the depletion of carbon dioxide occurs at a much faster rate than is the case with oxygen. The breathing air purged of $CO_2$ to the extent desired exits from $CO_2$ scrubber 39 via conduit 42.

The rejuvenated breathing air passes through altitude-programmed inhalation valve 43, a one-way valve which effects a pressure drop from the slightly greater loop pressure to the proper pressure for breathing. In a typical arrangement this pressure differential is about 5 psi.

Next the breathing air passes to oxygen sensor 44, which detects the presence of contaminant gases, usually manifest as a decrease in oxygen content and increase in nitrogen content. The condition of purity of the air passing through sensor 44 is expressed in an electrical output signal presented to signal comparing device 46. If there is sufficient contamination to require purging, a signal comparator 46 actuates solenoid-operated purging valve 47 to the open position permitting gas to leave the closed circuit. The pressure both in the inlet 48 to compressor 32 and downstream of compressor 32 is reduced causing bellows 22 to contract, rod 28 to move down and valve element 18 to move away from valve seat 19 thereby admitting pure oxygen to the breathing circuit. This admission of oxygen will continue until the purity of the circulating gas causes sufficient readjustment of the signal sensor 44 to signal comparator 46 to bring about closure of purge valve 47.

Rejuvenated breathing gas of controlled purity is supplied to masks 37 and 38 via conduits 49 and 50, respectively, through the one-way valves 51 and 52, respectively. Exhaled breath is vented from masks 37, 38 via one-way valves 53, 54, sterilizers 56, 57 and conduits 58, 59, which connect to conduit 48. In typical sterilizer construction an activated charcoal filter is employed acting to remove odors and trap bacteria and fungus.

In line 48 are located one-way exhalation valve 61, purge valve 47 and relief valve 62. The exhalation valve 61 serves to isolate the pilots' lungs from the relatively low pressure region in line 48 upstream of compressor 32. In the case of two or more people being supplied by the same closed breathing circuit, if all users were to violently exhale at the same time there would be a danger of overrunning compressor 32. To counter such a contingency, relief valve 62 is provided. Should the simultaneous exhalation occur this valve 62 would open and release some gas from line 48 to the cabin.

Exhaled breath is, therefore, compressed by compressor 32 and additional oxygen is provided as required through line 17. Thereafter, as noted hereinabove the gas passes to $CO_2$ scrubber 39. The outside surface of membrane 41 receives a circulating stream of air or other gas (circulating means not shown), in order to prevent undue $CO_2$ concentration over the outer surface of the membrane.

Figure 3:
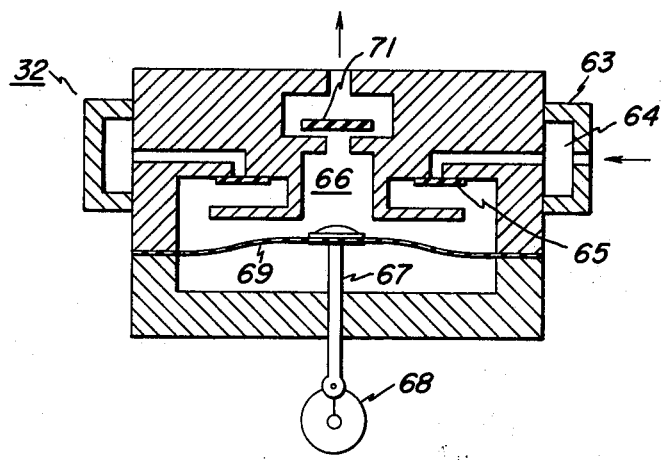

Compressor 32 is preferably of the diaphragm-type as is shown in FIG. 3. Whatever unit is employed it should either operate free of oil or be equipped with means for removing oil from the gas stream.

In compressor 32 shown exhaled breath gas enters from line 48 into annular distribution manifold 63 and passes through the annular opening 64 displacing annular flap valve 65 downward and entering main pump chamber 66. As actuating rod 67 is moved upward by the action of electric motor 68 by which it is driven, flexible diaphragm 69 is flexed upwards and the gas in chamber 67 is compressed and forced out through flap valve 71 into conduit 36.

In the event of power failure for motor 68, the valving arrangement presents the possibility for short term closed-loop breathing to continue through compressor 32 providing a small emergency breathing bag is provided as shown in dotted lines upstream of compressor 32 and means (not shown) are provided for selectively decreasing the pressure differential set by valve 43. Such a breathing bag would remain collapsed during normal operation of the compressor, because of suction in line 48.

If there is no means for selectively reducing the pressure differential introduced by programmed inhalation valve 43 and compressor 32 becomes inoperable, a waste emergency breathing operation will be initiated. As long as there is a supply of oxygen under pressure, oxygen will be supplied to masks 37, 38 via oxygen admission control 14 and exhaled gases will exit via relief valve 62 to the cabin. If desired, of course, an emergency supply of oxygen may be provided admissible through the system described herein.

Should any breathing station be unoccupied during flight, means (shutoff valves 72, 73) are provided to prevent unnecessary loss of oxygen from the closed system.

Therefore, a highly desirable variable pressure, constant volume closed circuit breathing system has been developed requiring considerably less space than proposed variable volume, constant pressure closed circuit breathing systems and providing automatic pressure breathing for users.

What we claim as new and desire to secure by Letters Patent of the United States is:

1. Valve means for controlling the transfer of a pressurized gas therethrough from a first volume to a second volume comprising in combination:
   a. a valve element positionable to selectively permit and stop gas transfer through the valve,
   b. first pressure-responsive means in communication with a third volume for generating a linearly directed force,
   c. first means connected to said first pressure-responsive means for exerting a constant counterforce to the force exerted thereby,
   d. second pressure-responsive means in communication with said second volume for generating a linearly directed force,
   e. second means connected to said second pressure-responsive means for exerting a constant counterforce to the force exerted thereby and having a preset value greater than the counterforce of said first means for exerting a constant counterforce and acting in a substantially parallel and opposite direction thereto, and
   f. means interconnecting said first pressure-responsive means, said valve element and said second pressure-responsive means whereby the transfer of pressurized gas from said first volume to said second volume is permitted whenever the difference in pressure between said second and third volumes is less than the preset difference in value between said first and second means for exerting constant counterforce.

* * * * *